US009444658B2

(12) United States Patent
Gerlach et al.

(10) Patent No.: US 9,444,658 B2
(45) Date of Patent: Sep. 13, 2016

(54) METHOD FOR SCHEDULING USERS IN A MOBILE OR WIRELESS COMMUNICATION SYSTEM, CORRESPONDING MOBILE TERMINAL AND BASE STATION

(75) Inventors: Christian Gerlach, Ditzingen (DE); Thorsten Wild, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 317 days.

(21) Appl. No.: 13/638,801

(22) PCT Filed: Feb. 25, 2011

(86) PCT No.: PCT/EP2011/052825
§ 371 (c)(1),
(2), (4) Date: Oct. 1, 2012

(87) PCT Pub. No.: WO2011/120744
PCT Pub. Date: Oct. 6, 2011

(65) Prior Publication Data
US 2013/0028215 A1 Jan. 31, 2013

(30) Foreign Application Priority Data

Apr. 1, 2010 (EP) .................................... 10305337

(51) Int. Cl.
*H04W 72/04* (2009.01)
*H04L 25/03* (2006.01)
(Continued)

(52) U.S. Cl.
CPC ....... *H04L 25/03343* (2013.01); *H04L 5/0037* (2013.01); *H04L 2025/03426* (2013.01); *H04L 2025/03802* (2013.01)

(58) Field of Classification Search
None
See application file for complete search history.

(56) References Cited

U.S. PATENT DOCUMENTS

| 7,872,963 B2 | 1/2011 | Choi et al. |
| 8,315,346 B2 | 11/2012 | Kim et al. |

(Continued)

FOREIGN PATENT DOCUMENTS

| EP | 2 375 581 A1 | 10/2011 |
| JP | 2007-517455 | 6/2007 |

(Continued)

OTHER PUBLICATIONS

NTT DOCOMO, "Views on CSI Feedback Scheme for MU-MIMO in LTE-Advanced," 3GPP TSG RAN WG1 Meeting #60, R1-101217, XP050418734, pp. 1-5, San Francisco, USA, Feb. 22-26, 2010.*

(Continued)

*Primary Examiner* — Ayaz Sheikh
*Assistant Examiner* — Sori Aga
(74) *Attorney, Agent, or Firm* — Fay Sharpe LLP

(57) ABSTRACT

The present invention relates to a method for scheduling users in a mobile or wireless radio communication system comprising a base station with a multiple antenna system and at least two users, said base station communicating with users using precoding weights at said multiple antenna system, an indication on precoding weights to be used for communication with a first user being sent by said first user on a feedback channel to said base station. According to the present invention, the method comprises the steps of: •Expressing said precoding weights used at said multiple antenna system as a combination of two types of precoding weights, a first type of precoding weights relating to long term channel information and a second type of precoding weights relating to short term channel changes; •Sending on said feedback channel from said first user an indication related to precoding weights of said first type which, if used at said multiple antenna system for communication with a second user, would cause interference below a threshold on said first user if both said first and second users were scheduled on identical resources.

14 Claims, 2 Drawing Sheets

(51) Int. Cl.
  *H04L 5/00*    (2006.01)
  *H04B 7/02*    (2006.01)

(56) References Cited

U.S. PATENT DOCUMENTS

| | | | |
|---|---|---|---|
| 2008/0063095 | A1 | 3/2008 | Khayrallah |
| 2008/0304468 | A1 | 12/2008 | Sun |
| 2009/0154588 | A1* | 6/2009 | Chen .................... H04L 1/0029 375/267 |
| 2010/0046643 | A1 | 2/2010 | Mondal et al. |
| 2010/0273514 | A1* | 10/2010 | Koo et al. .................... 455/501 |
| 2011/0176629 | A1* | 7/2011 | Bayesteh et al. ............. 375/267 |
| 2013/0064317 | A1 | 3/2013 | Tong et al. |

FOREIGN PATENT DOCUMENTS

| | | |
|---|---|---|
| JP | 2009-530898 | 8/2009 |
| JP | 2013-521734 | 6/2013 |

OTHER PUBLICATIONS

Alcatel-Lucent, ""Best Companion" reporting for improved single-cell MU-MIMO pairing," 3GPP TSG RAN WG1 #56 Meeting, R1-090926, XP050318767, pp. 1-5. Athens, Greece, Feb. 9-13, 2009.

Ericsson et al., "PMI-based Multi-Granular Feedback for SU/MU-MIMO Operation," 3GPP TSG-RAN WG1 #60, R1-100852, XP050418462, pp. 1-5, San Francisco, USA, Feb. 22-26, 2010.

Alcatel-Lucent et al., "Performance of "Best Companion" PMI reporting for improved single-cell MU-MIMO pairing," 3GPP TSG RAN WG1 #60 Meeting, R1-100929, XP050418526, pp. 1-5, San Francisco, USA, Feb. 22-26, 2010.

Alcatel-Lucent, "UE PMI feedback signaling for user pairing/coordination," 3GPP TSG RAN WG1 #55bis Meeting, R1-090051, XP050318000, pp. 1-3, Ljubljana, Slovenia, Jan. 12-16, 2009.

Ericsson et al., "A Flexible Feedback Concept," 3GPP TSG-RAN WG1 #59bis, R1-100051, XP050417800, pp. 1-5, Valencia, Spain, Jan. 18-22, 2010.

International Search Report for PCT/EP2011/052825 dated Mar. 17, 2011.

Alcatel-Lucent, "UE PMI feedback signalling for user pairing/coordination", 3GPP TSG-RAN WG 1 Meeting #56, Feb. 9, 2009, R1-090777.

Alcatel-Lucent Shanghai Bell, Alcatel-Lucent, "Correlation based explicit feedback," 3GPP TSG RAN WG1 Meeting #59bis, Valencia, Spain, Jan. 18-22, 2010, Agenda Item: 7.2.4.2, Document for: Discussion / Decision, R1-100719 (R1-100423), 12 pages.

\* cited by examiner

METHOD FOR SCHEDULING USERS IN A MOBILE OR WIRELESS COMMUNICATION SYSTEM, CORRESPONDING MOBILE TERMINAL AND BASE STATION

BACKGROUND OF THE INVENTION

The present invention relates to the field of telecommunication, and more specifically to a method for scheduling users in a mobile or wireless communication system using space division multiple access.

In a space division multiple access (SDMA) mobile or wireless radio communication system multiple users can be scheduled on the same resource when the users are sufficiently spatially separated. The spatial separation is used in order to direct the beams towards the different users so that the different beams are not interfering with each other. Such beams can be obtained when using a multiple antenna system at the transmitter. Different weights are applied to the different antenna elements enabling it to generate beams directed in the appropriate user direction.

Especially in Multiple Input Multiple Output (MIMO) systems at least two transmit antennas are used and separately encoded data signals can be transmitted per transmit antenna via two or more downlink beams of the downlink channel on the same resource.

For MIMO in LTE Release 8 (3GPP TS 36.213 V8.2.0) a codebook based precoding/beamforming will be used and single user MIMO feedback information comprises two parameters: CQI (CQI=channel quality indication) and PMI (PMI=precoding matrix indicator). CQI is a parameter indicating a channel quality of a downlink beam with a largest average received modulated carrier power. For LTE Release 8, the CQI parameter is an index for a transport format of the downlink channel. PMI is a parameter indicating a beam index, which corresponds to a precoding vector of the downlink beam for which the channel quality is reported. The beam index belongs to an entry of a codebook, which contains precoding vectors with all allowed Tx antenna weights combinations.

This situation is illustrated in FIG. 1 where the base station BS sends downlink reference signals (pilots) which are evaluated by the user terminal UE1. The user terminal UE1 determines then the best adapted precoding weights to be used based on a codebook shared between the base station and the user UE1 and determines the corresponding channel quality which would be experienced if the base station would send data using the selected precoding weights. Having done this evaluation, the user terminal sends on a feedback channel an indicator for the selected precoding vector (PMI) as well and an indicator for the corresponding channel quality (CQI). The PMI can be coded on a number of bits depending on the codebook size (a codebook comprising 16 precoding vectors would result on a 4 bit-PMI). Similarly a certain number of bits are used for transmitting the CQI.

The multi user MIMO technique uses multiple downlink beams (or precoding vectors), which are directed to multiple mobile terminals. It is beneficial for performance and overall data throughput in a radio cell or in a sector of the radio cell, if a downlink beam directed to a specific mobile terminal generates as few interference as possible to downlink beams directed to other mobile terminals. Therefore a base station may build a set of adequate mobile terminals which are using the same frequency/time resource. This means that the mobile terminals of such a set are scheduled at a same time with a same frequency but with spatial separation of downlink beams, so that the downlink beams generate fewest interference between each other.

A "best companion" approach aiming at associating 2 compatible precoding weights is illustrated in FIG. 2. In addition to the PMI CQI, user terminal UE1 further calculates the impact that a further transmission on the same resource would have on it in term of interference if a different precoding vector would be used during the transmission at the multiple antenna system. The user UE1 selects the precoding vector which would cause the least interference and further evaluates the level of interference that it would experience in case of a transmission by another User UEk using this best companion precoding vector. Both PCI and CQI are reported back on the feed back channel. The indicator of the best adapted precoding weights in case of transmission on the same resource (BCI) is reported together with the interference evaluation or more precisely the degradation on the channel quality (delta CQI) compared to the case where only one single transmission happens on the resource.

Having only the best companion reported is often not sufficient for an efficient scheduling. Especially, in case no user is located in the angular sector that would be covered by the beam corresponding to the BMI, this method is not sufficiently elaborated to provide good information on users which could be scheduled on the same resource. A solution could consist in reporting more than one best companion for example a list of possible companions with the corresponding channel quality degradation. This solution would however greatly increase the feedback amount which would be disadvantageous as this happens at the cost of the uplink data rate.

A particular object of the present invention is to provide for a solution to improve the relevant feedback information for being able to efficiently schedule users in SOMA network while keeping the amount of feedback at a reasonable level not to impact the uplink user data transmission.

Another object of the invention is to provide a base station and a mobile terminal adapted to support such mechanisms.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

These objects presented above, and others that appear below, are achieved in particular by a method for scheduling users in a mobile or wireless radio communication system according to claim 1, a mobile terminal according to claim 13, and a base station according to claim 14.

According to the present invention, precoding weights representing long term channel information part are isolated and transmitted alone as feedback information on the feedback channel. This presents the advantage to reduce the amount of feedback while guaranteeing reliable feedback information since this information is evolving quite slowly. Adding short term channel changes may be in some situation pure waste especially when the channel is changing quickly (e.g. for mobile terminals moving at high speed). Further, the rate at which updates of the long term channel information is reported can be reduced compared to prior art solutions.

The present invention foresees that precoding weights representing long term channel information are reported on the feedback channel with the goal to indicate that if a second user would be scheduled on the same resource and using the the precoding weights reported by the first user, then an interference below a threshold would be experienced at the first user (best companion).

Alternatively, precoding weights representing long term channel information are reported with the goal to indicate that if a second user would be scheduled on the same resource and not using the the precoding weights reported by the first user, then an interference below a threshold would be experienced at the first user (worst companion).

Which one of the two alternatives (best companion or worth companion) is relevant in a specific case should be preferably agreed upon between the user and the base station beforehand or be a system parameter.

In a further embodiment of the present invention, the precoding weights representing the long term channel information part are transmitted at a first rate on the feedback channel, while precoding weights representing the short term channel changes are transmitted at a second rate on the feedback channel, the first rate being much lower than the second rate. In this embodiment, we reach a more precise feedback since both long term and short term information are reported, which is advantageous when the channel changes are happening not so fast. This embodiment presents the advantage that we can selectively choose the rate at which the long term channel information are reported compared to the short term channel changes. Reducing the rate for reporting long term channel information enables it to save resources on the feedback channel.

In a further embodiment of the present invention, a way of determining the first codebook containing precoding weights representing long term channel information and the second codebook containing precoding weights representing short term channel changes is presented. This consists in keeping in the first codebook precoding weights performing a direction beamforming for all streams in the same direction making use of the correlation between antenna elements of the multiple antenna system, while the second codebook contains precoding weights constructed for performing a principal axis transformation.

In the present invention, reported precoding weights can be used for intracell interference reduction where the same base station receives and applies the reported best companion or worst companion in its own cell. Alternatively, the reported precoding weights can be used for intercell interference reduction where the base station receiving this information forwards it to a neighboring base station which in turn takes care of the reported information for scheduling additional users on the same resource.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

The functions of the various elements shown in the Figures, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any boxes shown in the Figures are conceptual only. Their function may be carried out through the operation of program logic, through dedicated logic, through the interaction of program control and dedicated logic, or even manually, the particular technique being selectable by the implementer as more specifically understood from the context.

Figure 1:
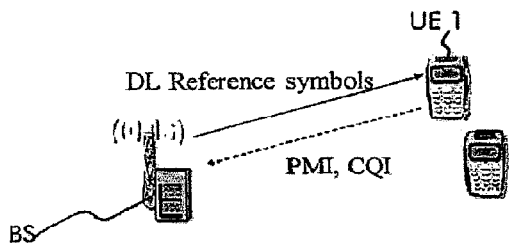
FIG. 1 shows a prior art precoding weights feedback method.
Figure 2:
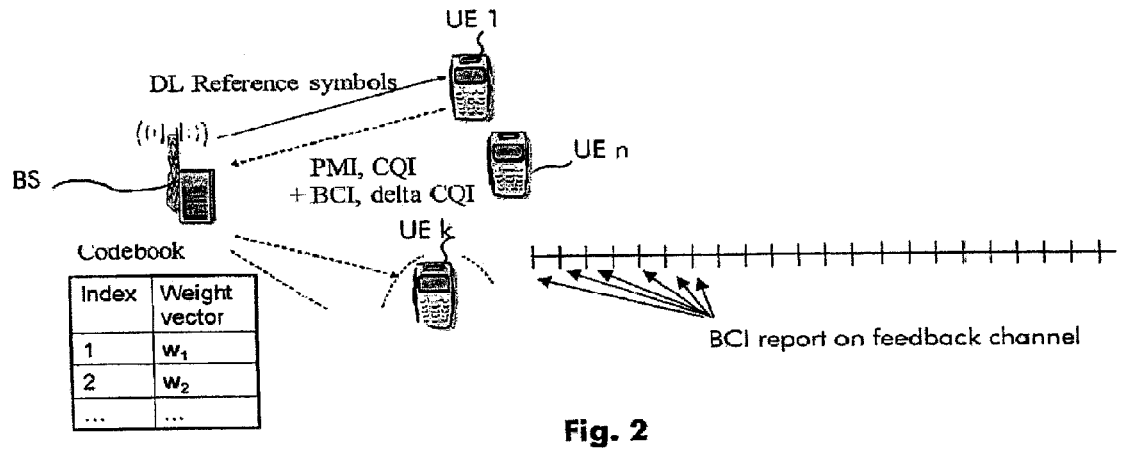
FIG. 2 shows a refined prior art precoding weights feedback method comprising best companion indicators.

FIGS. 1 and 2 have already been described in conjunction with the prior art.

In the following, the description will be made for the "best companion" approach. This means that the description will focus on the situation where the reported weights are used to schedule a second user on the same resource as a first user causing low interference on the first user.

It will be clear for a person skilled in the art that the described reporting can be similarly used in order to signal "the worst companion". The worst companion means that the reported weights should not be used to schedule a second user on the same resource as a first user to keep the interference experienced at the first user below a certain threshold. More precisely, the average interference calculated over the set of possible interfering precoding weights would be reduced by a certain value in the case the reported worth companion is not used.

In the following the intra cell approach will be described. This means that the reported precoding weights will be used by the base station to schedule another user in the same cell on the same resource.

It will be understood by those skilled in the art that this method could also be used in an inter cell approach. This would mean that the reported precoding weights can be forwarded by the base station to a neighbor base station, preferably over a base station to base station interface, in order to be used by the second base station to schedule users on the same resource as the reporting user.

Figure 3:
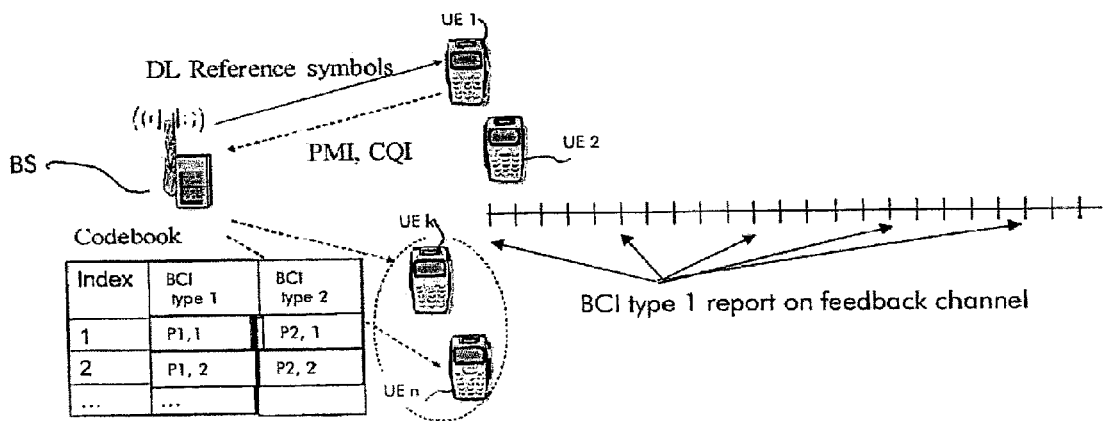
FIG. 3 shows an implementation of a precoding weights feedback method according to the present invention.

FIG. 3 shows an implementation of a precoding weights feedback method according to the present invention.

FIG. 3 shows a base station BS with a multiple antenna system and a plurality of users UE1, . . . , UEn. The task of BS is to schedule UEs as efficiently as possible. To make use of the multiple antenna system, SDMA and MIMO techniques can be used at BS. In particular, BS can schedule UEs on the same resource, while they are not interfering too much with each other if certain conditions are fulfilled.

In the framework of the present invention, two types of precoding weights are used. The first type of precoding weights, forming a first codebook, is representing a long term evolution of the channel between BS and UEs. The second type of precoding weights, forming a second codebook, is representing short term channel changes between the BS and the UEs. These two types of precoding weights are combined to generate a complete representation of the channel between BS and each UE. This combination may be a simple matrix product of the first type of precoding weights and the second type of precoding weights or a Kronecker product thereof or any other type of combination known by persons skilled in the art to appropriately combine long term and short term channel estimation.

More precisely, a new two stage Codebook structure is described in relation with the present invention. In this context we consider $W=G(W_1, W_2)$ where $G(.,.)$ is some matrix mapping function, $W_1$ is a precoding weights matrix of a first codebook suited to represent the channel correlation properties (thus long-term and/or wideband) and $W_2$ a precoding weights matrix of a second codebook suited for taking care of the instantaneous channel properties (thus frequency selective and/or short-term).

The antenna element correlation properties contained in certain antenna configurations are important for this model; consequently we distinguish between two different categories of antenna elements: correlated and uncorrelated. Correlated antenna elements are gathered in one subset each. In contrast, we assume no correlation between two such subsets. In short, if antenna elements have same polarization direction and are closely spaced we consider them as correlated.

Design Principle for First Codebook:

As the sub-array elements for each polarization direction are correlated, the optimal linear precoding weights vector depends on the angle of departure properties towards the mobile. This direction only changes very slowly.

Beamforming, or in other words applying precoding weights for creating a desired directivity for a calibrated sub-array is preferably done as follows:

For a desired beam direction $\theta_i$ of beam i the first complex weight is 1, the second one depends on a phase factor $\exp(j\phi_i)$ where it can be shown with $k=2\pi/\lambda$ being the wave number and $d_m$ the element spacing that:

$$\phi_i = -kd_m \sin(\theta_i).$$

Figure 4:
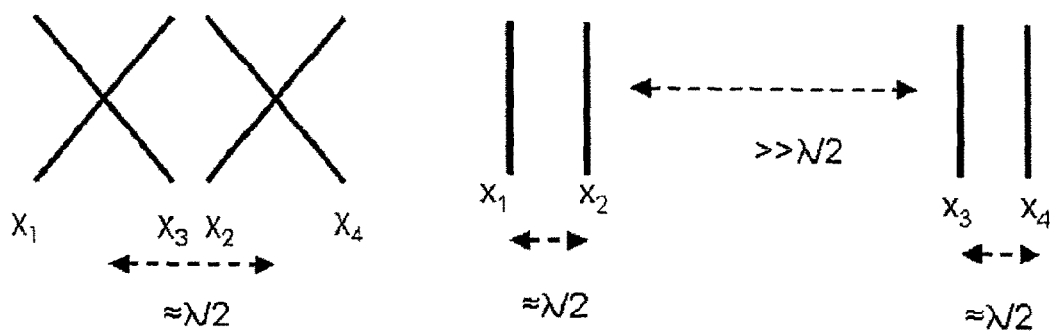
FIG. 4 shows two exemplary multiple antenna configurations in the framework of which the method according to the present invention can be implemented.

This notation can easily be generalized to more than 2 antennas. This beamforming approach is useful for a particular antenna array element subset: all closely-spaced elements with the same polarization direction. FIG. 4 shows two exemplary multiple antenna configurations in the framework of which the method according to the present invention can be implemented. While the previously described approach works for dual-x-pol-antenna-arrays—as shown on FIG. 4 (left)—it can also be used for vertically polarized sub array pairs as on FIG. 4 (right).

Design Principle for Second Codebook:

As the different polarizations in FIG. 4 (left)—or the distant element groups in FIG. 4 (right)—are uncorrelated, the second codebook takes care of finding the optimal transmit weighting for those uncorrelated subsets. This is done by a principal axis transformation using orthonormalized vectors taking care of the amplitudes and phase rotations of the channel. This results in a unitary matrix.

Consequently, for two times cross-pole antennas (as shown on FIG. 4 (left)), the precoding in case of dual-layer spatial multiplexing is derived by $$\begin{pmatrix} x_1 \\ x_2 \\ x_3 \\ x_4 \end{pmatrix} = \begin{pmatrix} 1 & 0 \\ e^{j\varphi} & 0 \\ 0 & 1 \\ 0 & e^{j\varphi} \end{pmatrix} \begin{pmatrix} u_{11} & u_{12} \\ u_{21} & u_{22} \end{pmatrix} \begin{pmatrix} s_1 \\ s_2 \end{pmatrix}$$

$$\begin{pmatrix} x_1 \\ x_2 \\ x_3 \\ x_4 \end{pmatrix} = \underbrace{\begin{pmatrix} 1 & 0 \\ e^{j\varphi} & 0 \\ 0 & 1 \\ 0 & e^{j\varphi} \end{pmatrix}}_{w_1} \underbrace{U_{SU}}_{w_2} \begin{pmatrix} s_1 \\ s_2 \end{pmatrix}$$

Where $W_1$ is a precoding weights of first type belonging to the first codebook $W_1 \in CB_1$ and representing the beamforming component (long term channel information) while $W_2$ is a precoding weights of second type belonging to the second codebook $W_2 \in CB_2$ and representing a principal axis transformation that is needed for the two streams. The precoding weights of second type adapt to fast fading conditions to the uncorrelated sets of antenna elements.

An equivalent notation could be realized with the Kronecker product with an appropriately modified codebook $CB_1$:

$$\begin{pmatrix} x_1 \\ x_2 \\ x_3 \\ x_4 \end{pmatrix} = \left( \begin{pmatrix} u_{11} & u_{12} \\ u_{21} & u_{22} \end{pmatrix} \otimes \begin{pmatrix} 1 \\ e^{j\varphi} \end{pmatrix} \right) \cdot \begin{pmatrix} s_1 \\ s_2 \end{pmatrix}$$

It will be clear that the presented decomposition in two precoding weights of two different types can be generalized to more than 4 antenna elements.

Coming back to FIG. 3, in the following, a composite precoding weights matrix is represented by a pair of indicators, the first indicator representing precoding weights of first type (p1, i) and the second indicator representing precoding weights of second type (p2, i). If in prior art the usual precoding weights indicators were coded on N bits, the first indicator could be coded on N−M bits and second indicator could be coded on M bits. It would not be excluded to have the first indicator coded on N1−M bits and the second indicator coded on M bits where N1<N.

According to a first embodiment of the present invention, only an indicator for precoding weights of type 1 (p1, i) is fed back by the UE1 for indicating the best appropriate precoding weights which, if used at the multiple antenna system of the BS for communication with a second user, would cause interference below a threshold on UE1 if both UE1 and second users were scheduled on identical resources.

The term same resources means that either the same time slot or the same frequency subcarrier or the same spreading code or the same combination of any of those is used for scheduling UE1 and a second user.

Due to the fact that the precoding weights of type 1 are reflecting the long term channel information, the interval between two indicators for precoding weights of type 1 feedback can be increased compared to the prior art precoding weights indicator feedback. As an example, in prior art, indicator were fed back every 5 ms. According to the present invention, indicators for precoding weights of type 1 could happen only every 100 ms.

Advantageously, in addition to an indicator for precoding weights of type 1, user UE1 further sends back an indication on the variation of the channel quality expected if a second user UE k uses the precoding weights of the first type reported as best companion while scheduled on the same resource as UE1. The calculation of this quality is preferably done per index of the first codebook while averaging over all possible entries of the second codebook.

According to a second embodiment of the present invention, and in order to exploit the gain in feedback rate, several precoding weights of type 1 and their corresponding impact delta CQI(1) on the interference at UE1 could be sequentially reported on the feedback channel to the BS. This would present the advantage that, without increasing the amount of feedback, the BS would have a large range of choices for precoding weights of type 1 to use. It is indeed not excluded, that the best reported precoding weights are not always usable especially in low loaded cells, where no other user is located spatially at a position that would be advantageous for using the best reported precoding weights of type 1. Consequently, it would be advantageous to feed back a list of 3 or 4 precoding weights of type 1 with their corresponding delta CQI(1) in the interval of time foreseen for the feedback of the best precoding weights of type 1.

In a further embodiment of the present invention, in addition to feeding back an indication on the best adapted precoding weights of type 1, an indication related to precoding weights of type 2 could be reported in order to refine the feedback and give also information on the short time channel changes. If the precoding weights of type 2 are used in combination with the precoding weights of type 1 at the multiple antenna system for communication with a second user UEk, interference on first user UE1 if both UE1 and UEk are scheduled on identical resources would be below a threshold equal to CQI+deltaCQI(1)+deltaCQI(2).

In a further preferred embodiment, indications on precoding weights of type 1 are fed back at a lower rate than indications on precoding weights of type 2. For example, indications on precoding weights of type 1 can be reported every 100 ms while precoding weights of type 2 can be reported every 5 ms as in prior art. Considering the fact that N−M bits are reported every 100 ms and Mbits are reported every 5 ms, we still obtain a reduced feedback rate compared to prior art methods, without reducing the accuracy of the feedback.

At the base station, a new calculation of the combination of precoding weights of type 1 and precoding weights of type 2 should preferably be performed at the feedback rate of the precoding weights of type 2, storing and using the same precoding weights of type 1 for all evaluations between two feedbacks of precoding weights of type 1.

Alternatively, and to provide a higher accuracy, an extrapolation of the value for the precoding weights of type one can be performed in the interval between two feedbacks of precoding weights of type 1. This extrapolation, could advantageously make use of previously reported precoding weights of type 1.

In a further embodiment of the present invention, indications on precoding weights of type 2 can be reported together with an expected variation of channel quality delta CQI(2). Consequently when combining both precoding weights of type 1 and precoding weights of type 2, the base station could also determine the total expected variation of channel quality as the sum of delta CQI(1) and delta CQI(2).

In a further embodiment of the present invention, in order to provide for more flexibility to the base station to select an appropriate pair of precoding weights of type 1 and type 2, it is foreseen to report, at the reporting rate of the precoding weights of type 2, a set of precoding weights of type 2 with their corresponding delta CQI(2). This would have the advantage that the base station would have the flexibility to associate to the reported precoding weights of type 1 any one of the reported precoding weights of type 2 out of the set.

The set of precoding weights of type 2 represents short term channel changes and should be sent at a higher rate that the rate used for reporting precoding weights of type 1.

The size of the set should preferably be selected in order to find a good tradeoff between the base station choice flexibility and the amount of feedback. For example, a set containing 4 precoding weights of type 2 and their corresponding delta CQI(2) can be appropriate.

Figure 5:
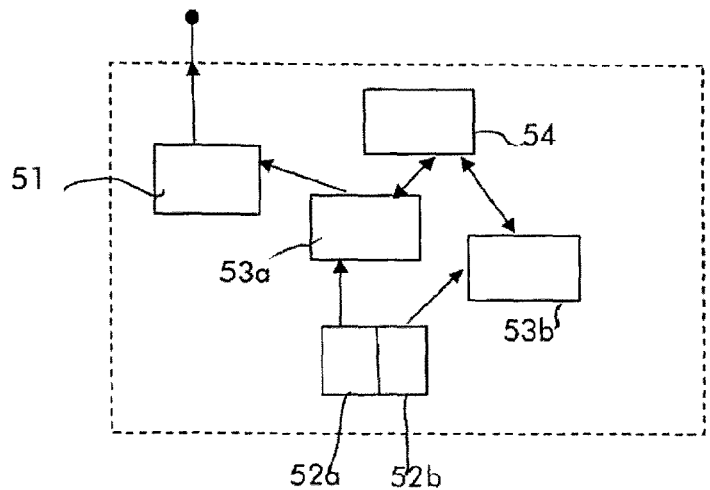
FIG. 5 shows an implementation of a mobile terminal according to the present invention.

FIG. 5 shows an implementation of a mobile terminal according to the present invention. The mobile terminal is adapted to be used in a mobile or wireless radio communication system. The mobile terminal is further adapted to communicate with a base station equipped with a multiple antenna system.

The mobile terminal comprises means 51 for sending an indication on precoding weights to be used by the base station when it communicates with the mobile terminal.

The mobile terminal further comprises means 52a, 52b for storing precoding weights as a combination of two types of precoding weights, a first type of precoding weights relating to long term channel information and a second type of precoding weights relating to short term channel changes. Means 52a and 52b preferably comprise each a codebook, the first codebook comprising the precoding weights of type 1 and the second codebook comprising the precoding weights of type 2.

The mobile terminal also comprises means 53a for sending on the feedback channel an indication related to precoding weights of the first type which, if used at the multiple antenna system for communication with a second user, would cause interference below a threshold on the first user if both the first and second users were scheduled on identical resources.

In a preferred embodiment of the present invention, the mobile terminal comprises means 53b for sending on the feedback channel an indication related to precoding weights of second type so that the base station can combine both short term and long term feedback information.

Means 53a and 53b can be separated entities but can also be implemented using the same module. It will be clear for a person skilled in the art that the different implementation of the method described above can be supported by means 53a and 53b so that all presented alternatives can be realized by the mobile terminal.

Optionally, the mobile terminal comprises means 54 for setting a feedback rate for the different precoding weights types, means 54 control the feedback rate of means 53a and 53b.

Preferably, means 54 sets a feedback rate higher for the precoding weights of type 2 compared to the feedback rate for precoding weights of type 1.

Figure 6:
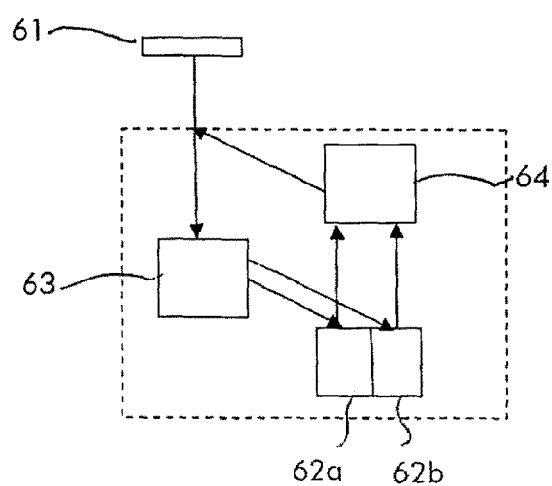
FIG. 6 shows an implementation of a base station according to the present invention.

FIG. 6 shows an implementation of a base station according to the present invention. The base station is equipped with a multiple antenna system 61 adapted to be used in a mobile or wireless radio communication system and to communicate with at least two users.

The base station comprises means 62a, 62b for storing precoding weights used at the multiple antenna system as a combination of two types of precoding weights, a first type of precoding weights relating to long term channel information and a second type of precoding weights relating to short term channel changes. Means 62a and 62b preferably comprise each a codebook, the first codebook comprising the precoding weights of type 1 and the second codebook comprising the precoding weights of type 2.

The base station comprises means 63 for receiving on the feedback channel from a first user an indication related to precoding weights of type 1 which, if used at the multiple antenna system 61 for communication with a second user, would cause interference below a threshold on the first user if both the first and second users were scheduled on identical resources.

In a preferred embodiment, means 63 further receives indication related to precoding weights of type 2.

Preferably the rate at which the precoding weights of type 2 are received is higher as the rate at which the precoding weights of type 1 are received. Optionally, the base station comprises means for correctly detecting or setting the feedback rate for the different precoding weights types.

The base station further comprises means 64 for selecting users to be scheduled on the same resource depending on an indication related to precoding weights of type 1.

In a preferred embodiment of the present invention, when the base station is receiving indications related to precoding weights of type 2, the base station can combine both short term and long term feedback information to make a decision at the scheduling module 64.

Any kind of feedback configurations described previously in conjunction with the description of the method can be supported by a base station according to the present invention.

The invention claimed is:

1. A method for scheduling users in a mobile or wireless radio communication system comprising at least one base station with a multiple antenna system and at least two users, said base station communicating with users using precoding weights at said multiple antenna system, an indication on precoding weights to be used for communication with a first user being sent by said first user on a feedback channel to said base station, said method further comprising:
   expressing said precoding weights used at said multiple antenna system as a combination of two types of precoding weights, a first type of precoding weights relating to long term channel information and a second type of precoding weights relating to short term channel changes;
   sending on said feedback channel from said first user an indication related to precoding weights of said first type which, if used at said multiple antenna system for communication with a second user, would cause interference below a threshold on said first user if both said first and second users were scheduled on identical resources or sending on said feedback channel an indication related to precoding weights of said first type which, if not used for communication with a second user, would cause interference below a threshold on said first user if both users were scheduled on identical resources; and
   sending on said feedback channel an indication related to precoding weights of said second type which, if used in combination with said precoding weights of said first type at said multiple antenna system for communication with a second user, would cause interference below a threshold on said first user if both said first and second users were scheduled on identical resources or sending on said feedback channel an indication related to precoding weights of said second type which, if used in combination with said precoding weights of said first type at said multiple antenna system for communication with a second user, would cause interference below a threshold on said first user if both said first and second users were scheduled on identical resources.

2. The method according to claim 1, wherein said indication related to precoding weights of said first type is sent at a lower rate than said indication related to precoding weights of said second type on said feedback channel.

3. The method according to claim 1, wherein said first type of precoding weights are part of a first codebook and said second type of precoding weights are part of a second codebook, said codebooks being known at said base station and at said users.

4. The method according to claim 1, wherein said combination of said two type of precoding weights consists in a matrix product of precoding weights of said first type with precoding weights of said second type.

5. The method according to claim 4, wherein said first codebook is constructed to perform a directional beamforming for all streams in the same direction making use of the correlation between antenna elements of said multiple antenna system and said second codebook is constructed to perform a principal axis transformation of parallel transmitted streams making use of uncorrelated antenna element parts.

6. The method according to claim 1, wherein said first user sends back an indication on the expected channel quality if said precoding weights are used in communication between said base station and said first user, said first user further sending on said feedback channel an indication on the variation of said channel quality expected if said second user uses said precoding weights of said first type while being scheduled on the same resource as said first user, said threshold being related to said expected channel quality and said variation of said channel quality.

7. The method according to claim 1, wherein said first user sends a list of precoding weights of said first type each associated with a corresponding expected variation of the channel quality, said list being sent on said feedback channel between said first user and said base station.

8. The method according to claim 1, wherein, said precoding weights to be used for a communication with said first user are precoding weights of said first type only or precoding weights of both said first type and said second type or combined precoding weights.

9. The method according to claim 1, wherein an indication of precoding weights of said second type is fed back together with an expected variation of channel quality, said precoding weights of second type corresponding to said precoding weights of said first type.

10. The method according to claim 1, wherein said indication on precoding weights corresponds to a precoding matrix indicator.

11. The method according to claim 1, wherein said indication related to precoding weights of said first type and or of said second type reported on said feedback channel to a first base station are forwarded from said first base station to a second base station, said second base station taking this information into account when scheduling users under its coverage.

12. A mobile terminal adapted to be used in a mobile or wireless radio communication system comprising at least one base station equipped with a multiple antenna system, said mobile terminal comprising means for sending an indication on precoding weights to be used by said base station for communication with said mobile terminal, said mobile terminal further comprising:
  memory configured to store precoding weights as a combination of two types of precoding weights, a first type of precoding weights relating to long term channel information and a second type of precoding weights relating to short term channel changes; and
  a transmitter configured to send on said feedback channel an indication related to precoding weights of said first type which, if used at said multiple antenna system for communication with a second user, would cause interference below a threshold on said first user if both said first and second users were scheduled on identical resources or means for sending on said feedback channel an indication related to precoding weights of said first type which, if not used for communication with a second user, would cause interference below a threshold on said first user if both users were scheduled on identical resources.

13. A base station equipped with a multiple antenna system adapted to be used in a mobile or wireless radio communication system and to communicate with at least two users, said base station comprising:
  memory configured to store precoding weights used at said multiple antenna system as a combination of two types of precoding weights, a first type of precoding weights relating to long term channel information and a second type of precoding weights relating to short term channel changes;
  a receiver configured to receive on said feedback channel from a first user an indication related to precoding weights of said first type which, if used at for communication with a second user, would cause interference below a threshold on said first user if both said first and second users were scheduled on identical resources or means for receiving on said feedback channel from a first user an indication related to precoding weights of said first type which, if not used for communication with a second user, would cause interference below a threshold on said first user if both said first and second users were scheduled on identical resources; and
  a processor configured to select users to be scheduled on the same resource depending on said indication related to precoding weights of said first type.

14. The method according to claim 1, wherein said first type of precoding weights are part of a first codebook and said second type of precoding weights are part of a second codebook, wherein said first user sends back an indication on the expected channel quality if said precoding weights are used in communication between said base station and said first user, said threshold being related to said expected channel quality, and wherein said expected channel quality is calculated per index of said first codebook while averaging over all possible entries of said second codebook.

* * * * *